(12) United States Patent
Wu

(10) Patent No.: US 11,758,108 B2
(45) Date of Patent: Sep. 12, 2023

(54) IMAGE TRANSMISSION METHOD, IMAGE DISPLAY DEVICE, IMAGE PROCESSING DEVICE, IMAGE TRANSMISSION SYSTEM, AND IMAGE TRANSMISSION SYSTEM WITH HIGH-TRANSMISSION EFFICIENCY

(71) Applicant: Qingdao Pico Technology Co., Ltd., Qingdao (CN)

(72) Inventor: Jian Wu, Beijing (CN)

(73) Assignee: QINGDAO PICO TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 17/882,381

(22) Filed: Aug. 5, 2022

(65) Prior Publication Data

US 2022/0408071 A1 Dec. 22, 2022

Related U.S. Application Data

(63) Continuation of application No. PCT/CN2022/099504, filed on Jun. 17, 2022.

(30) Foreign Application Priority Data

Jun. 18, 2021 (CN) .......................... 202110681037.5

(51) Int. Cl.
*H04N 13/194* (2018.01)
*H04N 13/275* (2018.01)
(Continued)

(52) U.S. Cl.
CPC ........... *H04N 13/194* (2018.05); *H04L 65/70* (2022.05); *H04L 65/764* (2022.05);
(Continued)

(58) Field of Classification Search
None
See application file for complete search history.

(56) References Cited

U.S. PATENT DOCUMENTS

2005/0265391 A1* 12/2005 Bartfai ................... H04L 49/90
370/474
2005/0289626 A1* 12/2005 Aboulgasem .... H04N 21/42676
725/111
(Continued)

FOREIGN PATENT DOCUMENTS

CN 101600099 A 12/2009
CN 101668192 A 3/2010
(Continued)

OTHER PUBLICATIONS

Pehlivan et al., "End-to-end stereoscopic video streaming system," 2006 IEEE International Conference on Multimedia and Expo., pp. 2169-2172 (Year: 2006).*
(Continued)

*Primary Examiner* — Anh-Tuan V Nguyen
(74) *Attorney, Agent, or Firm* — ARENTFOX SCHIFF LLP

(57) ABSTRACT

Provided is an image transmission method. Left-eye image data and right-eye image data corresponding to a same original image frame in a target video are divided into sub-images on the image processing device side, multiple sets of image data in one-to-one correspondence with the sub-images are generated, and transmitted to the image display device through transmission threads. Each of the multiple sets of image data includes a sub-image, and first and second sequence numbers that correspond to the sub-image. Left-eye image data and right-eye image data corresponding to a same original image frame are obtained by combining sub-images in the multiple sets of image data, by the image display device, based on first and second sequence numbers in the multiple sets of image data. Finally, a left-eye image corresponding to the left-eye image data and a
(Continued)

```
┌─ S610
A plurality of sets of image data, which are transmitted by an image
processing device through a plurality of transmission threads, are
received, wherein each of the plurality of sets of image data
includes a sub-image, and a first sequence number and a second
sequence number that correspond to the sub-image
            │
            ▼  ┌─ S620
Left-eye image data and right-eye image data are obtained by
combining, based on first sequence numbers and second sequence
numbers in the plurality of sets of image data, a plurality of sub-
images corresponding to a same image frame in the plurality of sets
of image data
            │
            ▼  ┌─ S630
A left-eye image corresponding to the left-eye image data and a
right-eye image corresponding to the right-eye image data are
played synchronously
``` right-eye image corresponding to the right-eye image data are played.

13 Claims, 7 Drawing Sheets

(51) Int. Cl.
H04N 13/344 (2018.01)
H04L 65/75 (2022.01)
H04N 13/398 (2018.01)
H04L 65/70 (2022.01)

(52) U.S. Cl.
CPC ......... *H04N 13/275* (2018.05); *H04N 13/344* (2018.05); *H04N 13/398* (2018.05)

(56) References Cited

U.S. PATENT DOCUMENTS

| | | | | |
|---|---|---|---|---|
| 2013/0100248 | A1* | 4/2013 | Kadono | H04N 19/88 348/43 |
| 2014/0071920 | A1* | 3/2014 | Kamei | H04W 72/0486 370/329 |
| 2014/0078249 | A1* | 3/2014 | Wang | H04N 19/70 348/43 |
| 2014/0181324 | A1* | 6/2014 | Hsu | G06F 3/0659 710/5 |
| 2016/0337639 | A1 | 11/2016 | Yang et al. | |
| 2017/0026571 | A1* | 1/2017 | Eltoft | H04N 23/698 |
| 2017/0054697 | A1* | 2/2017 | Zhang | H04N 21/2347 |
| 2017/0302978 | A1 | 10/2017 | Hu et al. | |
| 2020/0045352 | A1* | 2/2020 | Eksten | H04L 43/0882 |
| 2021/0176293 | A1* | 6/2021 | Xin | H04L 1/1607 |

FOREIGN PATENT DOCUMENTS

| | | |
|---|---|---|
| CN | 106991665 A | 7/2017 |
| CN | 110192391 A | 8/2019 |
| CN | 113473106 A | 10/2021 |
| WO | 2013012884 A1 | 1/2013 |

OTHER PUBLICATIONS

International Search Report issued in corresponding International Application No. PCT/CN2022/099504 dated Aug. 15, 2022.

* cited by examiner

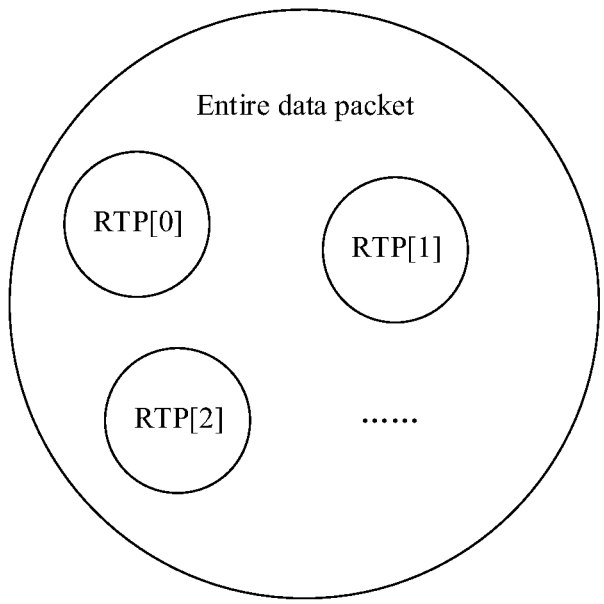

FIG. 3C

```
 1       0                   1                   2                   3                   4
 2       0 1 2 3 4 5 6 7 1 2 3 4 5 6 7 1 2 3 4 5 6 7 1 2 3 4 5 6 7
 3      +-+-+-+-+-+-+-+-+-+-+-+-+-+-+-+-+-+-+-+-+-+-+-+-+-+-+-+-+-+-+-+-+
 4      |V=2|P|X|  CC   |M|     PT      |       sequence number         |
 5      +-+-+-+-+-+-+-+-+-+-+-+-+-+-+-+-+-+-+-+-+-+-+-+-+-+-+-+-+-+-+-+-+
 6      |                           timestamp                           |
 7      +-+-+-+-+-+-+-+-+-+-+-+-+-+-+-+-+-+-+-+-+-+-+-+-+-+-+-+-+-+-+-+-+
 8      |           synchronization source (SSRC) identifier            |
 9      +=+=+=+=+=+=+=+=+=+=+=+=+=+=+=+=+=+=+=+=+=+=+=+=+=+=+=+=+=+=+=+=+
10      |            contributing source (CSRC) identifiers             |
11      |                             ....                              |
12      +-+-+-+-+-+-+-+-+-+-+-+-+-+-+-+-+-+-+-+-+-+-+-+-+-+-+-+-+-+-+-+-+
```

FIG. 4

```
         0                   1                   2                   3                   4
         0 1 2 3 4 5 6 7 1 2 3 4 5 6 7 1 2 3 4 5 6 7 1 2 3 4 5 6 7
        +-+-+-+-+-+-+-+-+-+-+-+-+-+-+-+-+-+-+-+-+-+-+-+-+-+-+-+-+-+-+-+-+
        |      defined by profile       |           length              |
        +-+-+-+-+-+-+-+-+-+-+-+-+-+-+-+-+-+-+-+-+-+-+-+-+-+-+-+-+-+-+-+-+
        |                        header extension                       |
        |                             ....                              |
        +-+-+-+-+-+-+-+-+-+-+-+-+-+-+-+-+-+-+-+-+-+-+-+-+-+-+-+-+-+-+-+-+
```

FIG. 5

IMAGE TRANSMISSION METHOD, IMAGE DISPLAY DEVICE, IMAGE PROCESSING DEVICE, IMAGE TRANSMISSION SYSTEM, AND IMAGE TRANSMISSION SYSTEM WITH HIGH-TRANSMISSION EFFICIENCY

CROSS-REFERENCE TO RELATED APPLICATIONS

This application is a continuation of International Application No. PCT/CN2022/099504, filed on Jun. 17, 2022, which claims the priority and rights of the Chinese Patent Application No. 202110681037.5, filed on Jun. 18, 2021 and entitled "IMAGE TRANSMISSION METHOD, IMAGE DISPLAY DEVICE, IMAGE PROCESSING DEVICE, AND IMAGE TRANSMISSION SYSTEM", the entire disclosure of which is incorporated herein by reference.

FIELD

Embodiments of the present disclosure relate to the technical field of image transmission, and more particularly, to image transmission methods, an image display device, an image processing device, and an image transmission system.

BACKGROUND

A Head Mounted Display (HMD) is a display device that can be worn on a user's head, and can realize different effects such as Virtual Reality (VR), Augmented Reality (AR), and Mixed Reality (MR).

Typically, an HMD performs binocular rendering. That is, the HMD renders a left-eye image corresponding to the user's left eye and a right-eye image corresponding to the user's right eye at the same time, and the left-eye image and the right-eye image are pictures captured at the same moment. In this case, a three-dimensional image with a depth of field and a layering effect can be formed in the user's brain, which makes the experience of virtual reality more realistic.

At present, in order to render left-eye images based on left-eye image data and right-eye images based on right-eye image data, an HMD receives left-eye image data and right-eye image data from a Personal Computer (PC) through two independent transmission channels respectively, thus realizing synchronous transmission of left-eye image data and right-eye image data. In practice, it takes a long time for the PC to transmit the left-eye image data and the right-eye image data to the HMD, and the transmission efficiency is low.

SUMMARY

An object of the present disclosure is to provide novel technical solutions of image transmission methods, an image display device, an image processing device, and an image transmission system.

According to a first aspect of the present disclosure, an image transmission method applied in an image display device is provided. The method includes: receiving a plurality of sets of image data, which are transmitted by an image processing device through a plurality of transmission threads, wherein each of the plurality of sets of image data includes a sub-image, and a first sequence number and a second sequence number that correspond to the sub-image, the sub-image is any one of a plurality of sub-images obtained by segmenting target data, the target data includes left-eye image data and right-eye image data corresponding to any target image frame of a plurality of image frames of a target video, the first sequence number indicates a playback order position of the target image frame in the plurality of image frames, and the second sequence number indicates an arrangement order position of each sub-image in the plurality of sub-images; obtaining left-eye image data and right-eye image data by combining, based on first sequence numbers and second sequence numbers in the plurality of sets of image data, a plurality of sub-images corresponding to a same image frame in the plurality of sets of image data; and playing a left-eye image corresponding to the left-eye image data and a right-eye image corresponding to the right-eye image data synchronously.

Optionally, said obtaining the left-eye image data and the right-eye image data by combining, based on the first sequence numbers and the second sequence numbers in the plurality of sets of image data, the plurality of sub-images corresponding to the same image frame in the plurality of sets of image data includes: determining, based on the first sequence numbers in the plurality of sets of image data, the plurality of sub-images corresponding to the same image frame; and storing, based on the second sequence numbers of the plurality of sub-images corresponding to the same image frame, the sub-images corresponding to the same image frame in a predetermined buffer sequentially, to obtain the left-eye image data and the right-eye image data.

Optionally, said receiving the plurality of sets of image data which are transmitted by the image processing device through the plurality of transmission threads includes: receiving a plurality of target Real-time Transport Protocol (RTP) data packets, which are in one-to-one correspondence with the plurality of sets of image data and transmitted by the image processing device through the plurality of transmission threads, each of the plurality of target RTP data packets having a set of image data encapsulated therein.

Optionally, the image data further includes a predetermined image data identifier. Said receiving the plurality of target RTP data packets which are in one-to-one correspondence with the plurality of sets of image data and transmitted by the image processing device through the plurality of transmission threads includes: receiving an RTP data packet; and determining, when the RTP data packet includes the predetermined image data identifier, the RTP data packet as a target RTP data packet.

According to a second aspect of the present disclosure, an image transmission method applied in an image processing device is provided. The method includes: obtaining a plurality of sub-images by segmenting target data, the target data including left-eye image data and right-eye image data corresponding to any target image frame of a plurality of image frames of a target video; determining a first sequence number and a second sequence number that correspond to each of the plurality of sub-images, the first sequence number indicating a playback order position of the target image frame in the plurality of image frames, and the second sequence number indicating an arrangement order position of each sub-image in the plurality of sub-images; generating, based on the determination, a plurality of sets of image data which are in one-to-one correspondence with the plurality of sub-images, each of the plurality of sets of image data including the sub-image, and the first sequence number and the second sequence number that correspond to the sub-image; and transmitting, through a plurality of transmission threads, the plurality of sets of image data to an image display device, for the image display device to obtain the left-eye image data and the right-eye image data by combining, based on first sequence numbers and second sequence numbers in the plurality of sets of image data, a plurality of sub-images in the plurality of sets of image data.

Optionally, said generating, based on the determination, the plurality of sets of image data which are in one-to-one correspondence with the plurality of sub-images includes: obtaining a plurality of target RTP data packets by encapsulating, in each of the plurality of target RTP data packets, the sub-image in each of the plurality of sets of image data, and the first sequence number and the second sequence number that correspond to the sub-image. Said transmitting, through the plurality of transmission threads, the plurality of sets of image data to the image display device includes: determining, based on a number of the plurality of transmission threads and a number of the plurality of target RTP data packets, a number of target RTP data packets corresponding to each of the plurality of transmission threads; and distributing, based on the number of target RTP data packets corresponding to each of the plurality of transmission threads, the plurality of target RTP data packets to the plurality of transmission threads for transmitting.

Optionally, the image data further includes a predetermined image data identifier, in such a manner that when receiving a plurality of RTP data packets transmitted by the image processing device through the plurality of transmission threads, the image display device determines an RTP data packet including the predetermined image data identifier as a target RTP data packet.

According to a third aspect of the present disclosure, an image display device is provided. The image display device includes: a memory configured to store a computer program; and a processor configured to execute the computer program to implement the method according to the first aspect.

According to a fourth aspect of the present disclosure, an image processing device is provided. The image processing device includes a memory configured to store a computer program; and a processor configured to execute the computer program to implement the method according to the second aspect.

According to a fifth aspect of the present disclosure, an image transmission system is provided. The image transmission system includes the image display device according to the third aspect and the image processing device according to the fourth aspect.

According to a sixth aspect of the present disclosure, there is also provided a computer-readable storage medium having a computer program stored thereon. The computer program, when executed by a processor, implements the method according to the first aspect or the second aspect of the present disclosure.

One beneficial effect of the embodiment of the present disclosure is that on the side of the image display device, the plurality of sets of image data, which are transmitted by the image processing device through the plurality of transmission threads, can be received. Each of the plurality of sets of image data includes the sub-image, and the first sequence number and the second sequence number that correspond to the sub-image. The sub-image is any one of the plurality of sub-images obtained by segmenting the target data. The target data includes left-eye image data and right-eye image data corresponding to any target image frame of the plurality of image frames of the target video. The first sequence number indicates the playback order position of the target image frame in the plurality of image frames, and the second sequence number indicates the arrangement order position of each sub-image in the plurality of sub-images. Then, the left-eye image data and the right-eye image data can be obtained by combining, based on first sequence numbers and second sequence numbers in the plurality of sets of image data, the plurality of sub-images corresponding to the same image frame in the plurality of sets of image data, and next the left-eye image corresponding to the left-eye image data and the right-eye image corresponding to the right-eye image data can be played synchronously. From this, it can be seen that the embodiment of the present disclosure can transmit the left-eye image data and the right-eye image data through the plurality of transmission threads, thereby effectively shortening the time for transmitting image data from the image processing device to the image display device and improving the image transmission efficiency. In this process, after obtaining the left-eye image data and the right-eye image data, the embodiment of the present disclosure can synchronously play the left-eye image corresponding to the left-eye image data and the right-eye image corresponding to the right-eye image data, thus ensuring synchronous display of the left-eye image and the right-eye image.

Other features of the specification and its advantages will become apparent from the following detailed description of exemplary embodiments of the specification with reference to the accompanying drawings.

BRIEF DESCRIPTION OF DRAWINGS

The accompanying drawings which are incorporated in and constitute a part of the specification illustrate embodiments of the specification and together with the description thereof serve to explain the principles of the specification.

FIG. 3C is a schematic diagram of a relationship between an entire data packet that needs to be transmitted by a plurality of transmission threads at a time and a plurality of target RTP data packets according to some embodiments of the present disclosure.

FIG. 4 is a schematic diagram of a format of a header of a target RTP data packet according to some embodiments of the present disclosure.

FIG. 5 is a schematic diagram of a format of an extended header of a target RTP data packet according to some embodiments of the present disclosure.

DESCRIPTION OF EMBODIMENTS

Various exemplary embodiments of the present disclosure will now be described in detail with reference to the accompanying drawings. It should be noted that the relative arrangements of components and steps, numeric expressions, and values set forth in the embodiments do not limit the scope of the present disclosure unless otherwise specified.

The following description of at least one exemplary embodiment is in fact illustrative only and is in no way intended to limit the present disclosure and its application or use.

Techniques, methods, and devices known to those of ordinary skill in the related art may not be discussed in detail, but where appropriate, such techniques, methods, and devices should be regarded as part of the present specification.

In all examples shown and discussed herein, any specific value should be interpreted as illustrative only and not as a limitation. Therefore other examples of exemplary embodiments may have different values.

It should be noted that like numerals and letters denote like items in the following drawings, and therefore, once an item is defined in one drawing, it does not need to be further discussed in subsequent drawings.

At present, VR devices (such as HMD) can perform binocular rendering, so that users can form a three-dimensional image with a depth of field and a layering effect in their head, which makes users' experience of virtual reality more realistic.

Figure 1:
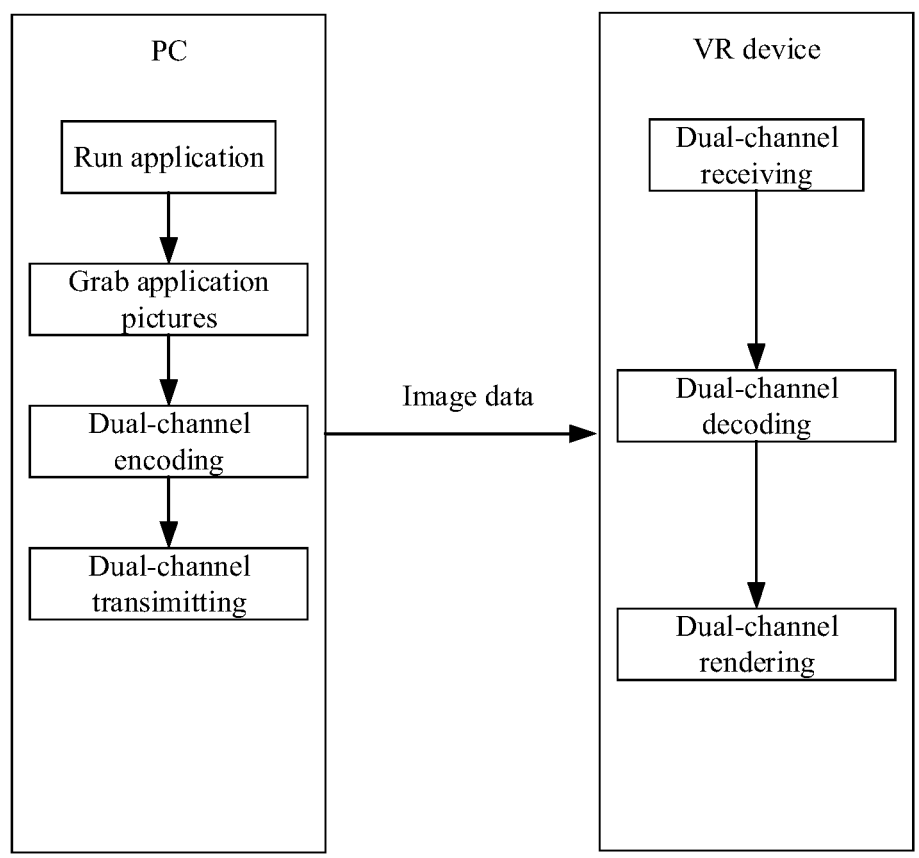
FIG. 1 is a schematic diagram illustrating image data processing of a PC and a VR device in the related art.

As shown in FIG. 1, a VR device can be wired or wirelessly connected to a Personal Computer (PC). On the PC side, the PC runs an application and plays application pictures. For example, the PC runs a video application to play video pictures, or the PC runs a game application to play game pictures. In this case, the PC grabs application pictures and processes a same frame of the application pictures to transform it into a left-eye image corresponding to the left eye and a right-eye image corresponding to the right eye. The PC has two transmission channels: a left-eye data channel and a right-eye data channel (such as dual channels of the PC in FIG. 1). An encoder is provided in each of the two transmission channels for encoding data (such as dual-channel encoding in FIG. 1).

The left-eye image data corresponding to the left-eye image in the PC terminal is transmitted through the left-eye data channel. After the left-eye image data is transmitted to the encoder corresponding to the left-eye data channel, the left-eye image data is encoded by the encoder, and the encoded left-eye image data continues to be transmitted in the left-eye data channel of the PC terminal and finally transmitted to the left-eye data channel of the VR device. Similarly, the right-eye image data corresponding to the right eye image in the PC terminal is transmitted through the right eye data channel. After the right-eye image data is transmitted to the encoder corresponding to the right-eye data channel, the right-eye image data is encoded by the encoder, and the encoded right-eye image data continues to be transmitted in the right-eye data channel of the PC terminal and finally transmitted to the right-eye data channel of the VR device. In this case, dual-channel transmission as in FIG. 1 is implemented.

The VR device also has two transmission channels: a left-eye data channel and a right-eye data channel (such as dual channels in the VR device in FIG. 1). Similar to the PC, a decoder and a renderer are provided in each of the left-eye data channel and the right-eye data channel of the VR device. The left eye data channel of the VR device receives the encoded left-eye image data from the PC terminal, and transmits the encoded left-eye image data through the left eye data channel. After the encoded left-eye image data is transmitted to the decoder corresponding to the left-eye data channel of the VR device, the encoded left-eye image data is decoded by the decoder to obtain left-eye image data. The left-eye image data continues to be transmitted in the left-eye data channel of the VR device. After being transmitted to the renderer of the left-eye data channel of the VR device, the left-eye image data is rendered by the renderer and displayed on the display screen of the VR device. The right-eye data channel of the VR device receives the encoded right-eye image data from the PC terminal, and the processing mode of the encoded right-eye image data in the VR device is similar to the above-described processing mode of the encoded left-eye image data, and can be learned by specifically referring to the above-described processing process of the left-eye image data, which will not be described here.

For a user wearing a VR device, the left eye of the user watches the left eye image displayed on the display screen of the VR device, and the right eye of the user watches the right eye image displayed on the display screen of the VR device. Through dual-channel decoding and dual-channel rendering in the VR device, a three-dimensional image with a depth of field and a layering effect can be formed in the user's brain, which makes the user's experience of virtual reality more realistic.

At present, in the process of transmitting image data from the PC to the VR device, a single thread is used to transmit the image data. In the case of an image frame containing a large amount of data, such as an intra-encoded frame (i.e., an I frame, which is completely preserved) or an Instantaneous Decoding Refresh (IDR) frame among image frames, it takes a long time to transmit the image data by using the single thread, and the transmission efficiency is low.

In view of the technical problems existing in the above implementations, the present disclosure provides an image transmission method, an image display device, an image processing device, and an image transmission system to effectively solve the problem of low image data transmission efficiency in the process of transmitting image data to an image display device for binocular rendering.

Hereinafter various embodiments and examples according to the present disclosure will be described with reference to the accompanying drawings.

Method Embodiment

Figure 2:
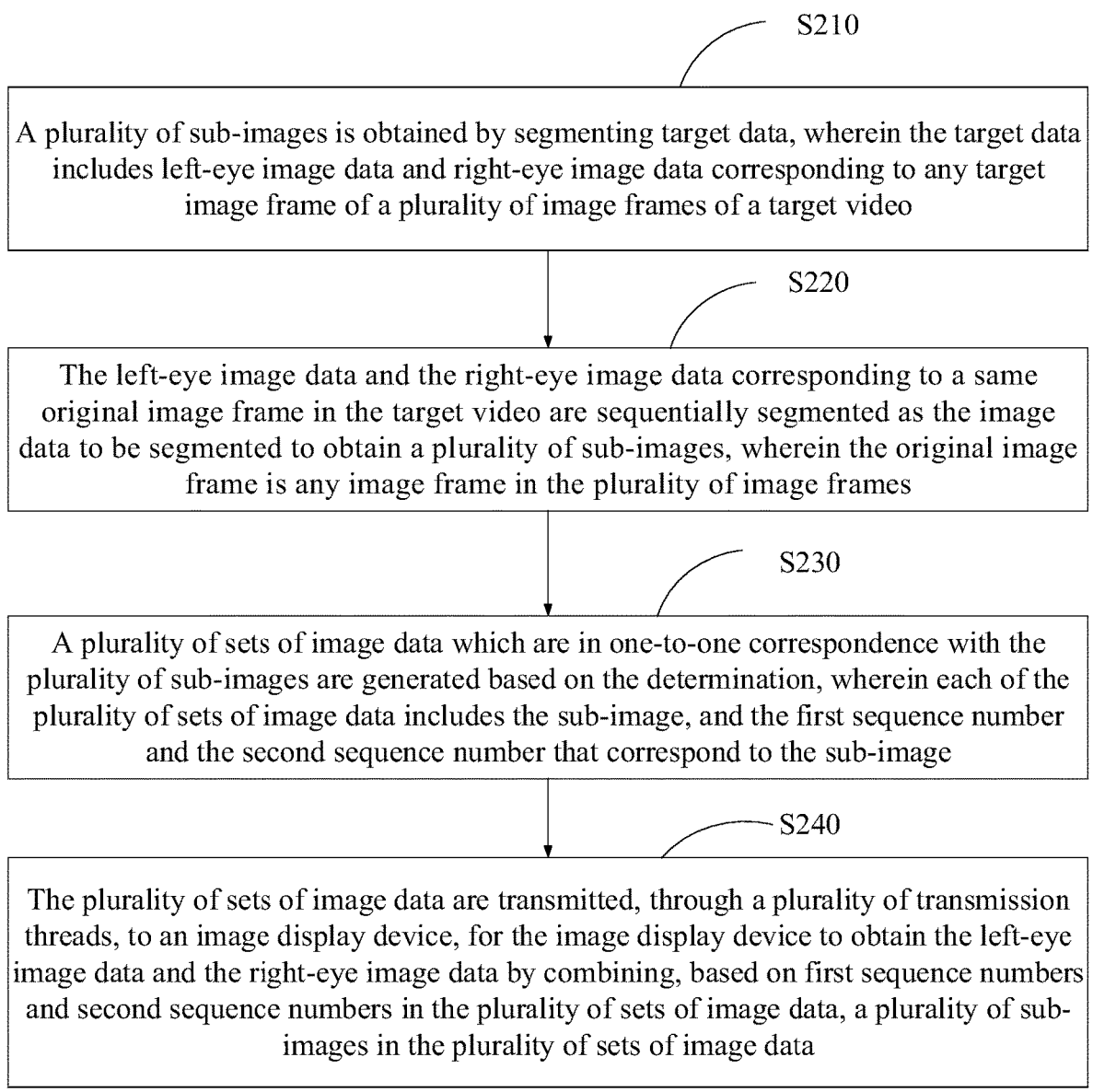
FIG. 2 is a flow chart illustrating an image transmission method according to some embodiments of the present disclosure.

FIG. 2 is a flow chart illustrating an image transmission method according to some embodiments of the present disclosure. The method embodiment may be implemented by an image processing device. The image processing device may be, for example, a PC.

As shown in FIG. 2, the image transmission method includes the following steps S210 to S250.

At step S210: a plurality of sub-images is obtained by segmenting target data. The target data includes left-eye image data and right-eye image data corresponding to any target image frame of a plurality of image frames of a target video.

The left-eye image data is image data corresponding to the left-eye image corresponding to the target image frame, and the right-eye image data is image data corresponding to the right-eye image corresponding to the target image frame.

Figure 3A:
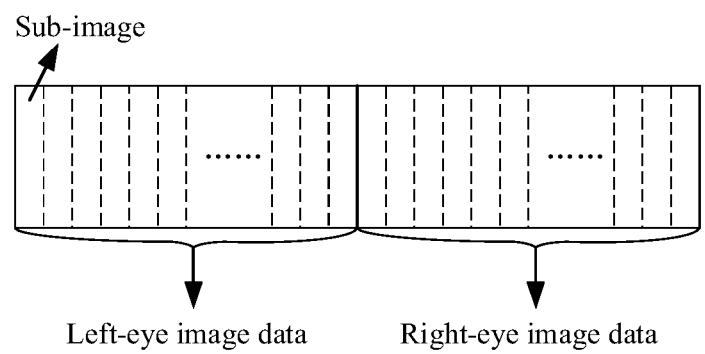
FIG. 3A is a schematic diagram illustrating a segmentation of left-eye image data and right-eye image data of a same original image frame according to some embodiments of the present disclosure.

For example, as shown in FIG. 3A, the left-eye image data may be segmented first and then the right-eye image data may be segmented to obtain a plurality of sub-images.

Figure 3B:
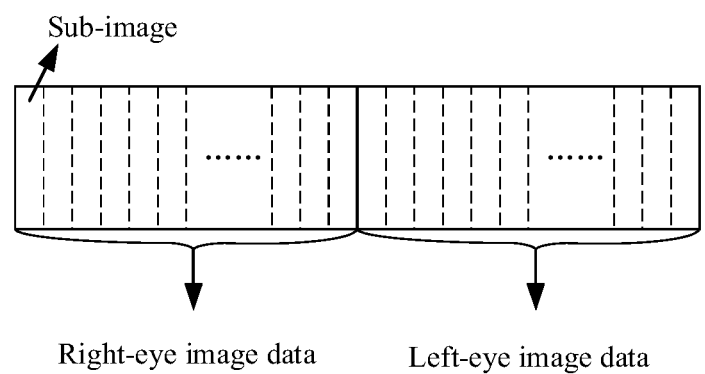
FIG. 3B is a schematic diagram illustrating another segmentation of left-eye image data and right-eye image data of a same original image frame according to some embodiments of the present disclosure.

For example, as shown in FIG. 3B, the right-eye image data may be segmented first and then the left-eye image data may be segmented to obtain a plurality of sub-images.

For example, due to a limitation of the Maximum Transmission Unit (MTU) of the network (MTU is 1500 bytes), the left-eye image data and the right-eye image data corresponding to the target image frame are segmented to obtain a plurality of sub-images with smaller data lengths, each of which has a data length smaller than or equal to 1400 bytes.

At step S220: a first sequence number and a second sequence number that correspond to each of the plurality of sub-images are determined. The first sequence number indicates a playback order position of the target image frame in the plurality of image frames, and the second sequence number indicates an arrangement order position of each sub-image in the plurality of sub-images.

The plurality of image frames can be sequentially numbered based on the playback order positions of the plurality of image frames in the target video, and the index of each image frame is the first sequence number that correspond to the image frame. The index of the target image frame is the first sequence number that correspond to the target image frame.

For example, the first sequence numbers are denoted as frameIndex (0) to frameIndex (g), where frameIndex (0)=0, frameIndex (1)=1, frameIndex (2)=2 . . . frameIndex (g)=g, g is a natural number and g≥0. If the playback order position of the target image frame in a plurality of image frames of the target video is 5, the first sequence number of the target image frame is 5.

The plurality of sub-images is obtained by segmenting the target image frame, and a sequence number of each of the plurality of sub-images is the first sequence number of the target image frame. When the first sequence numbers of a plurality of sub-images are the same, the plurality of sub-images comes from a same image frame.

Upon determining a second sequence number of each sub-image, no matter whether the left-eye image data is segmented first and then the right-eye image data is segmented or the right-eye image data is segmented first and then the left-eye image data is segmented, a sequential order of the obtained sub-images is taken as an arrangement order of the sub-images, and the sub-images are numbered based on the arrangement order to obtain the second sequence numbers corresponding to the sub-images.

It is to be noted that the left-eye image data and the right-eye image data can be obtained after the plurality of sub-images are combined in the arrangement order.

As an example, the second sequence numbers are denoted as packetIndexInframe (0) to packetIndexInframe (k), where packetIndexInframe (0)=0, packetIndexInframe (1)=1, packetIndexInframe (2)=2 . . . packetIndexInframe (k)=k, k is a natural number and k>1. If an arrangement order position of one of the sub-images in the sub-images is 6, the second sequence number of the sub-image is 6.

At step S230: a plurality of sets of image data which are in one-to-one correspondence with the plurality of sub-images are generated based on the determination. Each of the plurality of sets of image data includes the sub-image, and the first sequence number and the second sequence number that correspond to the sub-image.

In some embodiments, each set of image data may be encapsulated in a target Real-time Transport Protocol (RTP) data packet to obtain a plurality of target RTP data packets. Each target RTP data packet corresponds to a set of image data.

For example, for any one of a plurality of sub-images, the sub-image and a first sequence number and a second sequence number that correspond to the sub-image may be written to a target RTP data packet. The format of the target RTP data packet is the format of an RTP data packet.

For example, the format of a header of each target RTP data packet is shown in FIG. 4. V represents a version number of the RTP protocol, which occupies 2 bits. The current protocol version number of the RTP data packet shown in FIG. 4 is 2. P represents a fill flag, which occupies 1 bit. If P=1, one or more additional octets are added at the tail of the message, which are not part of the payload. X represents an extension flag, which occupies 1 bit. If X=1, there is an extension header following the RTP header. CC is a contributing source (CSRC) counter, which occupies 4 bits and indicates the number of CSRC identifiers. M represents a mark, which occupies 1 bit, and M has different meanings for different payloads. For a video, M marks the end of a frame. For an audio, M marks the beginning of a session. PT is a payload type, which occupies 7 bits, and is used to indicate the type of the payload in RTP messages, such as Global System for Mobile Communications (GSM) audio, JPEM (Joint Photographic Experts Group) image, etc. It is mostly used to distinguish audio stream from video stream in streaming media, which facilitates clients to parse the RTP message. SN (i.e. the sequence number in FIG. 4) is a sequence number, which occupies 16 bits. After each RTP data packet is transmitted, the transmitter increases the value of this field by 1. The receiver can detect the loss of the packet and recover the packet sequence through this field. The initial value of the sequence number is a random one. In FIG. 4, "timestamp" is a 32-bit timestamp that records a sampling time of a first byte of the data in the packet. It is indispensable for removing jitter and for synchronization. SSRC (the "synchronization source (SSRC) identifier" in FIG. 4) is a 32-bit synchronization source identifier, which indicates a source of the RTP data packet flow. There cannot be two identical SSRC values in a same RTP data packet session. CSRC (the "contributing source (CSRC) identifiers" in FIG. 4) represents contributing source identifiers, and each CSRC identifier occupies 32 bits and there can be 0 to 15 CSRC identifiers. Each CSRC identifies all of the contributing sources contained in the RTP message payload. The header of the target RTP data packet constantly occupies 12 bytes.

The first sequence number and the second sequence number that correspond to the sub-image can be written into the extension header of the target RTP data packet (as shown in the "header extension" section in FIG. 5). As shown in FIG. 5, the format of the extension header of the target RTP data packet includes a "defined by profile" field and "length". The "defined by profile" and "length" together occupy 4 bytes, and the first sequence number and the second sequence number each occupies 4 bytes. In this case, the total length of the RTP protocol field is 12+4+4+4=24 bytes. The MTU is 1500 bytes. In order for each target RTP data packet to be transmitted normally in the network, the length of sub-images in each target RTP data is set to be 1400 bytes. In this case, a total length of a target RTP data packet is 1400+24=1424 bytes, which ensures that each target RTP data packet can be transmitted normally in the network.

For example, for an entire data packet that needs to be transmitted by a plurality of transmission threads at a time, the entire data packet may include the plurality of target RTP data packets described above (such as target RTP data packet RTP [0], target RTP data packet RTP [1], target RTP data packet RTP [2] . . . in FIG. 3C). The relationship between the plurality of target RTP data packets and the entire data packet is shown in FIG. 3C.

Of course it will be understood that each set of image data may also be set in a format similar to that of the data in the target RTP data packet described above. Embodiments of the present disclosure do not limit the specific format of each set of image data.

At step S240: the plurality of sets of image data are transmitted, through a plurality of transmission threads, to an image display device, for the image display device to obtain the left-eye image data and the right-eye image data by combining, based on first sequence numbers and second sequence numbers in the plurality of sets of image data, a plurality of sub-images in the plurality of sets of image data.

As an example, each transmission thread may transmit one or w sets of image data, where w is natural number and w>1.

In some embodiments, in the case of encapsulating, in a target RTP data packet, the sub-image in each of the plurality of sets of image data, and the first sequence number and the second sequence number that correspond to the sub-image, the number of target RTP data packets corresponding to each transmission thread can be determined based on the number of the plurality of transmission threads and the number of the plurality of target RTP data packets. Then, the plurality of target RTP data packets are distributed to the plurality of transmission threads for transmission based on the number of target RTP data packets corresponding to each transmission thread.

For example, the process of distributing the plurality of target RTP data packets to the plurality of transmission threads for transmission is as follows. The number of the plurality of transmission threads is M, M is a natural number, and M>1. The number of multiple target RTP data packets is N, and N is a natural number, and N>1. Therefore, the number of target RTP data packets transmitted through each transmission thread is (N/M). Corresponding sequence numbers can be set for N target RTP data packets to obtain N target RTP data packets with sequence numbers from 0 to N. In this case, a first transmission thread transmits target RTP data packets with sequence numbers 0 to (N/M), a second transmission thread transmits target RTP data packets with sequence numbers [(N/M)+1] to [2*(N/M)] . . . and so on. In the case that N is not an integer multiple of M, the number of target RTP data packets transmitted by the last transmission thread is smaller than the number of target RTP data packets transmitted by other transmission threads. M transmission threads temporarily enter a sleep state after transmitting N target RTP data packets, and are awakened, when a plurality of target RTP data packets need to be transmitted next time, to transmit the plurality of target RTP data packets.

In embodiments of the present disclosure, the left-eye image data and the right-eye image data corresponding to the target image frame in the target video can be divided into a plurality of sub-images with smaller data lengths. Then, each sub-image, and the first sequence number and the second sequence number that correspond to the sub-image are taken as a set of image data to obtain a plurality of sets of image data. By transmitting the plurality of sets of image data through a plurality of transmission threads, the time for the image processing device to transmit image data to the image display device can be effectively shortened. Especially for a video frame with a large amount of data, it can greatly shorten the time required for transmitting the video frame and improve the image transmission efficiency.

In some embodiments, the image data further includes a predetermined image data identifier, in such a manner that when receiving a plurality of RTP data packets transmitted by the image processing device through the plurality of transmission threads, the image display device determines an RTP data packet including the predetermined image data identifier as a target RTP data packet.

Figure 6:
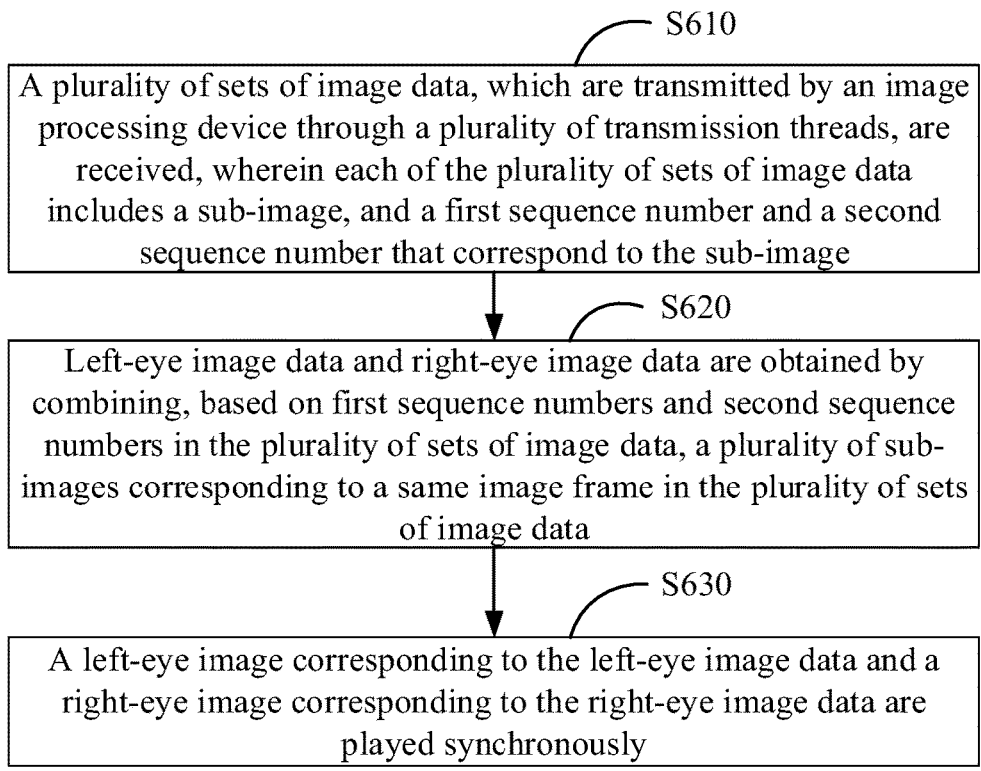
FIG. 6 is a flow chart illustrating another image transmission method according to some embodiments of the present disclosure.

FIG. 6 is a flow chart illustrating another image transmission method according to some embodiments of the present disclosure. Embodiments of the method may be implemented by an image display device. The image display device may be a VR device such as an HMD. The image display device may have a transmission channel.

As shown in FIG. 6, the image transmission method includes the following steps S610 to S630.

At step S610: a plurality of sets of image data, which are transmitted by an image processing device through a plurality of transmission threads, is received. Each of the plurality of sets of image data includes a sub-image, and a first sequence number and a second sequence number that correspond to the sub-image.

The image processing device and the process thereof for transmitting the plurality of sets of image data through the plurality of transmission threads may be learned by referring to corresponding descriptions in the above-described embodiments and will not be repeated here.

In step S610, the plurality of sets of image data transmitted by the plurality of transmission threads may be received correspondingly through a plurality of reception threads. The plurality of reception threads is in one-to-one correspondence with the plurality of transmission threads.

Each set of image data includes the sub-image, and the first sequence number and the second sequence number that correspond to the sub-image. The sub-image is any one of a plurality of sub-images obtained by segmenting target data. The target data includes left-eye image data and right-eye image data corresponding to any target image frame of a plurality of image frames of a target video. The first sequence number indicates a playback order position of the target image frame in the plurality of image frames, and the second sequence number indicates an arrangement order position of each sub-image in the plurality of sub-images.

The method for obtaining the first sequence number and the second sequence number can be learned by referring to the corresponding description in the above embodiment and will not be repeated here.

In some embodiments, said receiving the plurality of sets of image data which are transmitted by the image processing device through the plurality of transmission threads may include: receiving a plurality of target Real-time Transport Protocol (RTP) data packets, which are in one-to-one correspondence with the plurality of sets of image data and transmitted by the image processing device through the plurality of transmission threads, each of the plurality of target RTP data packets having a set of image data encapsulated therein.

At step S620: left-eye image data and right-eye image data are obtained by combining, based on first sequence numbers and second sequence numbers in the plurality of sets of image data, a plurality of sub-images corresponding to a same image frame in the plurality of sets of image data.

The first sequence number indicates the playback order position of the target image frame in the plurality of image frames of the target video. In this case, the first sequence numbers of the left-eye image data and the right-eye image data corresponding to a same image frame are the same.

In some embodiments, a plurality of sub-images corresponding to the same image frame may be determined based on the first sequence numbers in the plurality of sets of image data, and then the sub-images corresponding to the same image frame may be stored in a predetermined buffer sequentially based on the second sequence numbers of the plurality of sub-images corresponding to the same image frame to obtain the left-eye image data and the right-eye image data.

Figure 7:
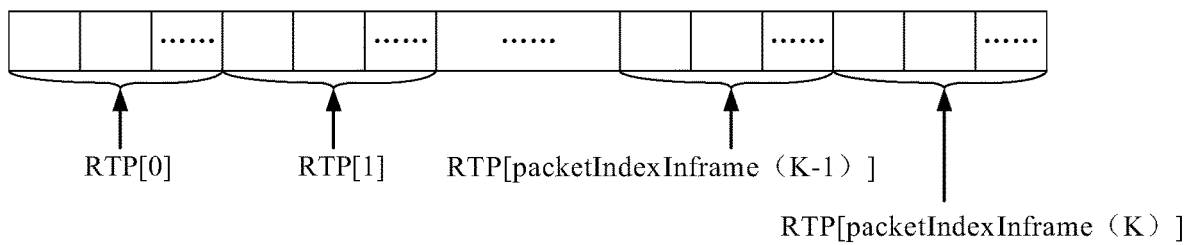
FIG. 7 is a schematic diagram of a buffering arrangement of sub-images in a plurality of target RTP data packets in a predetermined buffer according to some embodiments of the present disclosure.

In some embodiments, in a case of receiving the plurality of target RTP data packets which are in one-to-one correspondence with the plurality of sets of image data and transmitted by the image processing device through the plurality of transmission threads, the first sequence number and the second sequence number are stored at a position in an extension header of the target RTP data packet. Therefore, the first sequence number and the second sequence number in the extension header of the target RTP data packet are read first. After the plurality of target RTP data packets corresponding to the same image frame are determined based on the first sequence numbers, the sub-images in the plurality of target RTP data packets are sequentially stored in the predetermined buffer based on the second sequence numbers in the plurality of target RTP data packets. As shown in FIG. 7, the sub-images in the plurality of target RTP data packets are sequentially arranged in the order of the second sequence numbers as RTP [0], RTP [1] . . . RTP [packetIndexInframe (K−1)], RTP [packetIndexInframe (K)]. The second sequence numbers corresponding to two adjacent sub-images RTP [packetIndexInframe (K−1)] and RTP [packetIndexInframe (K)] are consecutive, and the difference between starting positions of the adjacent sub-images is the data length of one sub-image, where K is a natural number, and k≥K≥0.

At step S630: a left-eye image corresponding to the left-eye image data and a right-eye image corresponding to the right-eye image data are played synchronously.

The obtained left-eye image data and the right-eye image data corresponding to the same original image frame are transmitted to a decoder for decoding, and the decoded left-eye image data and right-eye image data are rendered synchronously, so that the left-eye image corresponding to the left-eye image data and the right-eye image corresponding to the right-eye image data can be displayed synchronously.

In some embodiments, the image data further includes a predetermined image data identifier. In this case, said receiving the plurality of target RTP data packets which are in one-to-one correspondence with the plurality of sets of image data and transmitted by the image processing device through the plurality of transmission threads includes: receiving an RTP data packet; determining, when the RTP data packet includes the predetermined image data identifier, the RTP data packet as a target RTP data packet.

One beneficial effect of the embodiment of the present disclosure is that on the side of the image display device, the plurality of sets of image data, which are transmitted by the image processing device through the plurality of transmission threads, can be received. Each of the plurality of sets of image data includes the sub-image, and the first sequence number and the second sequence number that correspond to the sub-image. The sub-image is any one of the plurality of sub-images obtained by segmenting the target data. The target data includes left-eye image data and right-eye image data corresponding to any target image frame of the plurality of image frames of the target video. The first sequence number indicates the playback order position of the target image frame in the plurality of image frames, and the second sequence number indicates the arrangement order position of each sub-image in the plurality of sub-images. Then, the left-eye image data and the right-eye image data can be obtained by combining, based on first sequence numbers and second sequence numbers in the plurality of sets of image data, the plurality of sub-images corresponding to the same image frame in the plurality of sets of image data, and next the left-eye image corresponding to the left-eye image data and the right-eye image corresponding to the right-eye image data can be played synchronously. From this, it can be seen that the embodiment of the present disclosure can transmit the left-eye image data and the right-eye image data through the plurality of transmission threads, thereby effectively shortening the time for transmitting image data from the image processing device to the image display device and improving the image transmission efficiency. In this process, after obtaining the left-eye image data and the right-eye image data, the embodiment of the present disclosure can synchronously play the left-eye image corresponding to the left-eye image data and the right-eye image corresponding to the right-eye image data, thus ensuring synchronous display of the left-eye image and the right-eye image.

Device Embodiment

Figure 8:
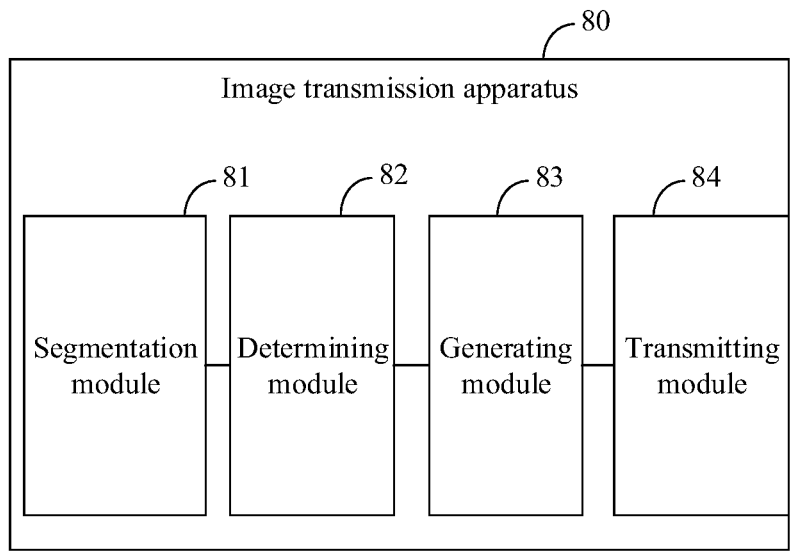
FIG. 8 is a block diagram illustrating a functional structure of an image transmission apparatus according to some embodiments of the present disclosure.

FIG. 8 is a block diagram illustrating a functional structure of an image transmission apparatus according to some embodiments of the present disclosure. The image transmission apparatus is applied in an image processing device. As shown in FIG. 8, the image transmission apparatus 80 includes a segmentation module 81, a determining module 82, a generating module 83, and a transmitting module 84.

The segmentation module 81 is configured to segment target data to obtain a plurality of sub-images. The target data includes left-eye image data and right-eye image data corresponding to any target image frame of a plurality of image frames of a target video.

The determining module 82 is configured to determine a first sequence number and a second sequence number that correspond to each sub-image. The first sequence number indicates a playback order position of the target image frame in the plurality of image frames, and the second sequence number indicates an arrangement order position of each sub-image in the plurality of sub-images.

The generating module 83 is configured to generate, based on the determination, a plurality of sets of image data which are in one-to-one correspondence with the plurality of sub-images. Each of the plurality of sets of image data includes the sub-image, and the first sequence number and the second sequence number that correspond to the sub-image.

The transmitting module 84 is configured to transmit, through a plurality of transmission threads, the plurality of sets of image data to an image display device, for the image display device to obtain the left-eye image data and the right-eye image data by combining, based on first sequence numbers and second sequence numbers in the plurality of sets of image data, a plurality of sub-images in the plurality of sets of image data.

The process for realizing the functions of each module of the image transmission apparatus 80 can be learned by referring to the corresponding description in the above-mentioned method embodiment and will not be described here.

The image processing device may be for example a PC.

Figure 9:
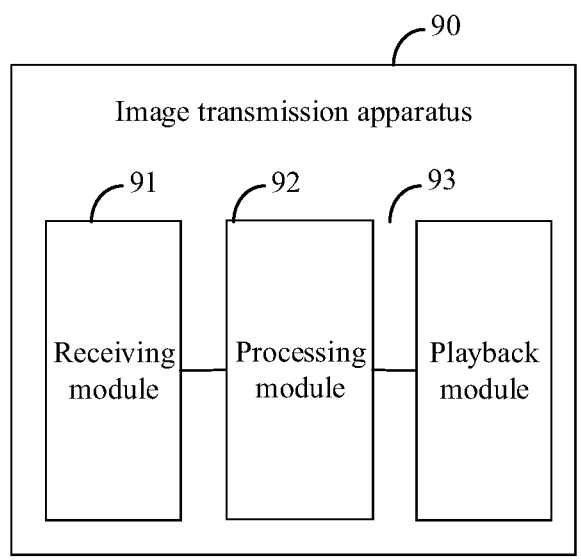
FIG. 9 is a block diagram illustrating a functional structure of another image transmission apparatus according to some embodiments of the present disclosure.

FIG. 9 is a block diagram illustrating a functional structure of another image transmission apparatus according to some embodiments of the present disclosure. The image transmission apparatus is applied in an image display device. As shown in FIG. 9, the image transmission apparatus 90 includes a receiving module 91, a processing module 92, and a playback module 93.

The receiving module 91 is configured to receive a plurality of sets of image data, which are transmitted by an image processing device through a plurality of transmission threads. Each of the plurality of sets of image data includes a sub-image, and a first sequence number and a second sequence number that correspond to the sub-image, the sub-image is any one of a plurality of sub-images obtained by segmenting target data, the target data includes left-eye image data and right-eye image data corresponding to any target image frame of a plurality of image frames of a target video, the first sequence number indicates a playback order position of the target image frame in the plurality of image frames, and the second sequence number indicates an arrangement order position of each sub-image in the plurality of sub-images.

The processing module 92 is configured to obtain left-eye image data and right-eye image data by combining, based on first sequence numbers and second sequence numbers in the plurality of sets of image data, a plurality of sub-images corresponding to a same image frame in the plurality of sets of image data.

The playback module 93 is configured to play a left-eye image corresponding to the left-eye image data and a right-eye image corresponding to the right-eye image data synchronously.

The process for realizing the functions of each module of the image transmission apparatus 90 can be learned by referring to the corresponding description in the above-mentioned method embodiments and will not be described here.

The image display device may, for example, be a VR device such as an HMD.

Figure 10:
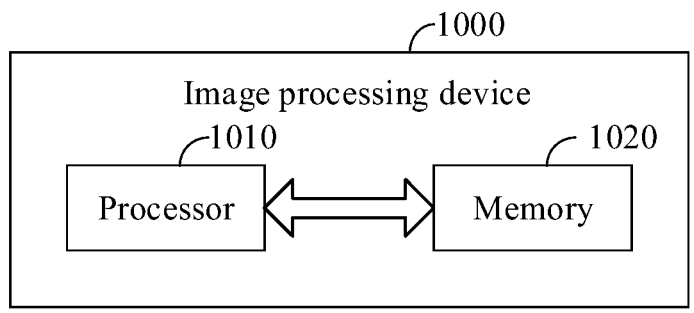
FIG. 10 is a schematic diagram of a hardware structure of an image processing device according to some embodiments of the present disclosure.

FIG. 10 is a schematic diagram of a hardware structure of an image processing device according to some embodiments of the present disclosure.

As shown in FIG. 10, the image processing device 1000 includes a processor 1010 and a memory 1020. The memory 1020 is configured to store an executable computer program, and the processor 1010 is configured to execute the method according to any of the above method embodiments under the control of the computer program.

The image processing device 1000 may be a PC.

Each module of the above image transmission apparatus 80 may be realized by the processor 1010 executing the computer program stored in the memory 1020 in the present embodiment or may be realized by another circuit configuration, which is not limited herein.

Figure 11:
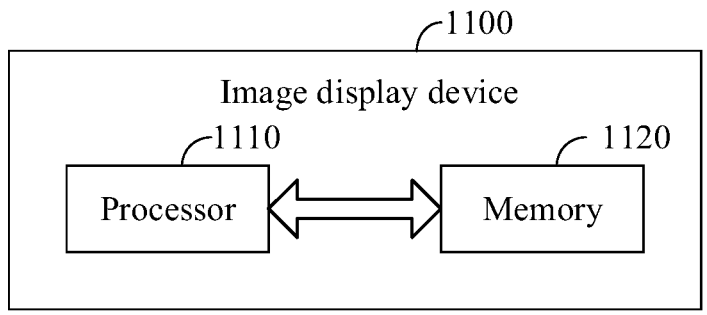
FIG. 11 is a schematic diagram of a hardware structure of an image display device according to some embodiments of the present disclosure.

FIG. 11 is a schematic diagram of a hardware structure of an image display device according to some embodiments of the present disclosure.

As shown in FIG. 11, the image display device 1100 includes a processor 1110 and a memory 1120. The memory 1120 is configured to store an executable computer program, and the processor 1110 is configured to execute the method according to any of the above method embodiments under the control of the computer program.

The image display device 1100 may be a VR device such as an HMD.

Each module of the above image transmission apparatus 90 may be realized by the processor 1110 executing the computer program stored in the memory 1120 in the present embodiment or may be realized by another circuit configuration, which is not limited herein.

System Embodiment

Figure 12:
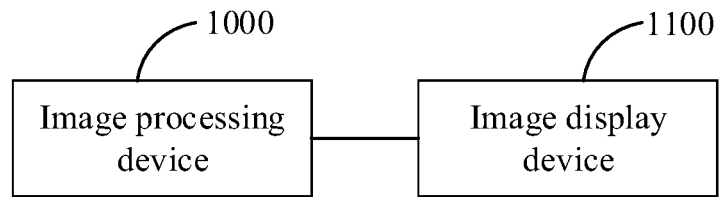
FIG. 12 is a schematic diagram illustrating an image transmission system according to some embodiments of the present disclosure.

FIG. 12 is a schematic diagram illustrating an image transmission system according to some embodiments of the present disclosure. As shown in FIG. 12, the image transmission system 1200 includes an image processing device 1000 and an image display device 1100.

Computer-Readable Storage Medium Embodiment

The embodiment provides a computer-readable storage medium, which stores executable commands. When the executable commands are executed by a processor, the method described in any one of method embodiments of the specification is executed (for example, the method corresponding to the above steps S210 to S240 or the method corresponding to the above steps S610 to S630).

One or more embodiments of the present specification may be systems, methods, and/or computer program products. The computer program product may include a computer-readable storage medium having computer-readable program instructions carried thereon for causing a processor to implement various aspects of this specification.

The computer-readable storage medium may be a tangible device that may hold and store instructions used by an instruction executing device. The computer-readable storage medium may be, for example, but is not limited to, an electrical storage device, a magnetic storage device, an optical storage device, an electromagnetic storage device, a semiconductor storage device, or any suitable combination of the above. More specific examples (non-exhaustive list) of computer-readable storage media include: portable computer disk, hard disk, random access memory (RAM), read-only memory (ROM), erasable programmable read-only memory (EPROM or flash memory), static random access memory (SRAM), portable compact disk read-only memory (CD-ROM), digital versatile disk (DVD), memory stick, floppy disk, mechanical encoding device, such as punched cards or raised structures in a groove having instructions recorded thereon, and any suitable combination of the above. The computer-readable storage media used herein are not interpreted as transient signals themselves, such as radio waves or other freely propagating electromagnetic waves, electromagnetic waves propagating through waveguides or other transmission media (e.g. optical pulses through fiber optic cables), or electrical signals transmitted through wires.

The computer-readable program instructions described herein may be downloaded from a computer-readable storage medium to various computing/processing devices, or to an external computer or external storage device over a network, such as the Internet, a local area network, a wide area network, and/or a wireless network. The network may include copper transmission cables, fiber optic transmissions, wireless transmissions, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the embodiments of this specification may be assembly instructions, instruction set architecture (ISA) instructions, machine instructions, machine-related instructions, microcode, firmware instructions, state setting data, or source or object code written in any combination of one or more programming languages. Programming languages include object-oriented programming languages, such as Smalltalk, C++, etc., and conventional procedural programming languages, such as "C" or similar programming languages. Computer readable program instructions may be executed entirely on the user's computer, partly on the user's computer, as a separate software package, partly on the user's computer and partly on a remote computer, or entirely on a remote computer or server. In the case involving a remote computer, the remote computer may be connected to the user computer over any kind of network, including a local area network (LAN) or a wide area network (WAN), or may be connected to an external computer (e.g. via the Internet using an Internet service provider). In some embodiments, aspects of the present specification are implemented by personalizing, using state information of computer-readable program instructions, an electronic circuit, such as a programmable logic circuit, a field programmable gate array (FPGA), or a programmable logic array (PLA), to execute the computer-readable program instructions.

Various aspects of the specification are described herein with reference to flowcharts and/or block diagrams of methods, apparatus (systems), and computer program products according to embodiments of the specification. It should be understood that each block of the flowchart and/or block diagram and combinations of the blocks in the flow chart and/or block diagram may be implemented by computer readable program instructions.

These computer readable program instructions may be provided to a processor of a general purpose computer, a special purpose computer, or other programmable data processing device, thereby producing a machine such that the instructions, when executed by a processor of a computer or other programmable data processing device, produce means for carrying out the functions/actions specified in one or more blocks in the flow chart and/or block diagram. These computer-readable program instructions may also be stored in a computer-readable storage medium. The instructions cause computers, programmable data processing devices, and/or other devices to operate in a specific manner, such that the computer-readable medium in which the instructions are stored includes an article of manufacture including instructions for implementing aspects of the functions/actions specified in one or more blocks in the flow chart and/or block diagram.

Computer readable program instructions may also be loaded onto a computer, other programmable data processing device, or other device, such that a series of operational steps are performed on the computer, other programmable data processing device, or other device to produce a computer-implemented process such that instructions executed on the computer, other programmable data processing device, or other device perform the functions/actions specified in one or more blocks in the flow chart and/or block diagram.

The flowcharts and block diagrams in the accompanying drawings illustrate architectures, functions and operations of possible implementations of systems, methods and computer program products in accordance with various embodiments of the present specification. In this regard, each block in a flow chart or block diagram may represent a part of a module, program segment, or instructions that contains one or more executable instructions for performing a specified logical function. In some alternative implementations the functions indicated in the blocks may also occur in a different order than those indicated in the drawings. For example, two successive blocks can actually be executed substantially in parallel, or they can sometimes be executed in reverse order, depending on the functionality involved. It is also noted that each block in the block diagram and/or flow chart, and combinations of the blocks in the block diagram and/or flow chart, may be implemented by a dedicated hardware-based system that performs a specified function or action, or may be implemented in a combination of dedicated hardware and computer instructions. It is well known to those skilled in the art that implementation by hardware, implementation by software, and implementation by a combination of software and hardware are all equivalent.

Embodiments of the present specification have been described above and the above description is exemplary not exhaustive and is not limited to the disclosed embodiments. Many modifications and changes will be apparent to those of ordinary skill in the art without departing from the scope and spirit of the illustrated embodiments. The terminology used herein is chosen to best explain the principles, practical applications or technical improvements in the market of the embodiments, or to enable other persons of ordinary skill in the art to understand the embodiments disclosed herein. The scope of the present application is defined by the appended claims.

What is claimed is:

1. An image transmission method, applied in an image display device, the method comprising:

receiving a plurality of sets of image data, which are transmitted by an image processing device through a plurality of transmission threads, wherein each of the plurality of sets of image data comprises a sub-image, and a first sequence number and a second sequence number that correspond to the sub-image, the sub-image is any one of a plurality of sub-images obtained by segmenting target data, the target data comprises left-eye image data and right-eye image data corresponding to any target image frame of a plurality of image frames of a target video, the first sequence number indicates a playback order position of the target image frame in the plurality of image frames, and the second sequence number indicates an arrangement order position of each sub-image in the plurality of sub-images;

obtaining left-eye image data and right-eye image data by combining, based on first sequence numbers and second sequence numbers in the plurality of sets of image data, a plurality of sub-images corresponding to a same image frame in the plurality of sets of image data; and playing a left-eye image corresponding to the left-eye image data and a right-eye image corresponding to the right-eye image data synchronously, wherein said obtaining the left-eye image data and the right-eye image data by combining, based on the first sequence numbers and the second sequence numbers in the plurality of sets of image data, the plurality of sub-images corresponding to the same image frame in the plurality of sets of image data comprises:
determining, based on the first sequence numbers in the plurality of sets of image data, the plurality of sub-images corresponding to the same image frame; and
storing, based on the second sequence numbers of the plurality of sub-images corresponding to the same image frame, the sub-images corresponding to the same image frame in a predetermined buffer sequentially, to obtain the left-eye image data and the right-eye image data.

2. The method according to claim 1, wherein said receiving the plurality of sets of image data which are transmitted by the image processing device through the plurality of transmission threads comprises:
receiving a plurality of target Real-time Transport Protocol (RTP) data packets, which are in one-to-one correspondence with the plurality of sets of image data and transmitted by the image processing device through the plurality of transmission threads, each of the plurality of target RTP data packets having a set of image data encapsulated therein.

3. The method according to claim 2, wherein the image data further comprises a predetermined image data identifier;
wherein said receiving the plurality of target RTP data packets which are in one-to-one correspondence with the plurality of sets of image data and transmitted by the image processing device through the plurality of transmission threads comprises:
receiving an RTP data packet;
determining, when the RTP data packet comprises the predetermined image data identifier, the RTP data packet as a target RTP data packet.

4. An image transmission method, applied in an image processing device, the method comprising:
obtaining a plurality of sub-images by segmenting target data, the target data comprising left-eye image data and right-eye image data corresponding to any target image frame of a plurality of image frames of a target video;
determining a first sequence number and a second sequence number that correspond to each of the plurality of sub-images, the first sequence number indicating a playback order position of the target image frame in the plurality of image frames, and the second sequence number indicating an arrangement order position of each sub-image in the plurality of sub-images;
generating, based on the determination, a plurality of sets of image data which are in one-to-one correspondence with the plurality of sub-images, each of the plurality of sets of image data comprising the sub-image, and the first sequence number and the second sequence number that correspond to the sub-image; and
transmitting, through a plurality of transmission threads, the plurality of sets of image data to an image display device, for the image display device to obtain the left-eye image data and the right-eye image data by combining, based on first sequence numbers and second sequence numbers in the plurality of sets of image data, a plurality of sub-images in the plurality of sets of image data,
wherein the image display device obtaining the left-eye image data and the right-eye image data by combining, based on first sequence numbers and second sequence numbers in the plurality of sets of image data, the plurality of sub-images in the plurality of sets of image data comprises:
determining, based on the first sequence numbers in the plurality of sets of image data, the plurality of sub-images corresponding to the same image frame; and
storing, based on the second sequence numbers of the plurality of sub-images corresponding to the same image frame, the sub-images corresponding to the same image frame in a predetermined buffer sequentially, to obtain the left-eye image data and the right-eye image data.

5. The method according to claim 4, wherein said generating, based on the determination, the plurality of sets of image data which are in one-to-one correspondence with the plurality of sub-images comprises:
obtaining a plurality of target RTP data packets by encapsulating, in each of the plurality of target RTP data packets, the sub-image in each of the plurality of sets of image data, and the first sequence number and the second sequence number that correspond to the sub-image;
wherein said transmitting, through the plurality of transmission threads, the plurality of sets of image data to the image display device comprises:
determining, based on a number of the plurality of transmission threads and a number of the plurality of target RTP data packets, a number of target RTP data packets corresponding to each of the plurality of transmission threads; and
distributing, based on the number of target RTP data packets corresponding to each of the plurality of transmission threads, the plurality of target RTP data packets to the plurality of transmission threads for transmitting.

6. The method according to claim 5, wherein the image data further comprises a predetermined image data identifier, in such a manner that when receiving a plurality of RTP data packets transmitted by the image processing device through the plurality of transmission threads, the image display device determines an RTP data packet comprising the predetermined image data identifier as a target RTP data packet.

7. An image display device, comprising:
a memory configured to store a computer program; and
a processor configured to execute the computer program to cause the image display device to:
receive a plurality of sets of image data, which are transmitted by an image processing device through a plurality of transmission threads, wherein each of the plurality of sets of image data comprises a sub-image, and a first sequence number and a second sequence number that correspond to the sub-image, the sub-image is any one of a plurality of sub-images obtained by segmenting target data, the target data comprises left-eye image data and right-eye image data corresponding to any target image frame of a plurality of image frames of a target video, the first sequence number indicates a playback order position of the target image frame in the plurality of image frames, and the second sequence number indicates an arrangement order position of each sub-image in the plurality of sub-images;
obtain left-eye image data and right-eye image data by combining, based on first sequence numbers and second sequence numbers in the plurality of sets of image data, a plurality of sub-images corresponding to a same image frame in the plurality of sets of image data; and play a left-eye image corresponding to the left-eye image data and a right-eye image corresponding to the right-eye image data synchronously, wherein said obtaining the left-eye image data and the right-eye image data by combining, based on the first sequence numbers and the second sequence numbers in the plurality of sets of image data, the plurality of sub-images corresponding to the same image frame in the plurality of sets of image data comprises:

determining, based on the first sequence numbers in the plurality of sets of image data, the plurality of sub-images corresponding to the same image frame; and storing, based on the second sequence numbers of the plurality of sub-images corresponding to the same image frame, the sub-images corresponding to the same image frame in a predetermined buffer sequentially, to obtain the left-eye image data and the right-eye image data.

8. The image display device according to claim 7, wherein said receiving the plurality of sets of image data which are transmitted by the image processing device through the plurality of transmission threads comprises:

receiving a plurality of target Real-time Transport Protocol (RTP) data packets, which are in one-to-one correspondence with the plurality of sets of image data and transmitted by the image processing device through the plurality of transmission threads, each of the plurality of target RTP data packets having a set of image data encapsulated therein.

9. The image display device according to claim 8, wherein the image data further comprises a predetermined image data identifier;

wherein said receiving the plurality of target RTP data packets which are in one-to-one correspondence with the plurality of sets of image data and transmitted by the image processing device through the plurality of transmission threads comprises:

receiving an RTP data packet;

determining, when the RTP data packet comprises the predetermined image data identifier, the RTP data packet as a target RTP data packet.

10. An image processing device comprising:
a memory configured to store a computer program; and
a processor configured to execute the computer program to implement the method according to claim 4.

11. The image processing device according to claim 10, wherein said generating, based on the determination, the plurality of sets of image data which are in one-to-one correspondence with the plurality of sub-images comprises:

obtaining a plurality of target RTP data packets by encapsulating, in each of the plurality of target RTP data packets, the sub-image in each of the plurality of sets of image data, and the first sequence number and the second sequence number that correspond to the sub-image;

wherein said transmitting, through the plurality of transmission threads, the plurality of sets of image data to the image display device comprises:

determining, based on a number of the plurality of transmission threads and a number of the plurality of target RTP data packets, a number of target RTP data packets corresponding to each of the plurality of transmission threads; and distributing, based on the number of target RTP data packets corresponding to each of the plurality of transmission threads, the plurality of target RTP data packets to the plurality of transmission threads for transmitting.

12. The image processing device according to claim 11, wherein the image data further comprises a predetermined image data identifier, in such a manner that when receiving a plurality of RTP data packets transmitted by the image processing device through the plurality of transmission threads, the image display device determines an RTP data packet comprising the predetermined image data identifier as a target RTP data packet.

13. An image transmission system, comprising:
the image display device according to claim 8; and
an image processing device, including:
an image processing memory configured to store an image processing computer program; and
and an image processing processor configured to execute the image processing computer program to cause the image processing device to:

obtain a plurality of sub-images by segmenting target data, the target data comprising left-eye image data and right-eye image data corresponding to any target image frame of a plurality of image frames of a target video;

determine a first sequence number and a second sequence number that correspond to each of the plurality of sub-images, the first sequence number indicating a playback order position of the target image frame in the plurality of image frames, and the second sequence number indicating an arrangement order position of each sub-image in the plurality of sub-images;

generate, based on the determination, a plurality of sets of image data which are in one-to-one correspondence with the plurality of sub-images, each of the plurality of sets of image data comprising the sub-image, and the first sequence number and the second sequence number that correspond to the sub-image; and transmit, through a plurality of transmission threads, the plurality of sets of image data to an image display device, for the image display device to obtain the left-eye image data and the right-eye image data by combining, based on first sequence numbers and second sequence numbers in the plurality of sets of image data, a plurality of sub-images in the plurality of sets of image data, wherein the image display device obtaining the left-eye image data and the right-eye image data by combining, based on first sequence numbers and second sequence numbers in the plurality of sets of image data, the plurality of sub-images in the plurality of sets of image data comprises:

determining, based on the first sequence numbers in the plurality of sets of image data, the plurality of sub-images corresponding to the same image frame; and storing, based on the second sequence numbers of the plurality of sub-images corresponding to the same image frame, the sub-images corresponding to the same image frame in a predetermined buffer sequentially, to obtain the left-eye image data and the right-eye image data.

* * * * *